United States Patent [19]

Madzsar et al.

[11] 3,711,146
[45] Jan. 16, 1973

[54] STREAMLINED VEHICLE CONFIGURATION
[75] Inventors: George C. Madzsar, Lakewood; Otto Kozma, Wickliffe, both of Ohio
[73] Assignee: White Motor Corporation, Cleveland, Ohio
[22] Filed: July 29, 1970
[21] Appl. No.: 59,238

[52] U.S. Cl. ...................296/1 S, 105/17, 280/403
[51] Int. Cl. ..............................................B62d 35/00
[58] Field of Search .....296/1 S; 280/403; 105/17, 20

[56] References Cited

UNITED STATES PATENTS

| 3,425,740 | 2/1969  | De Vaughn    | 296/1 S   |
| 3,486,464 | 12/1969 | Dean et al.  | 105/8     |
| 1,186,963 | 6/1916  | Young et al. | 105/17    |
| 2,514,695 | 7/1950  | Dempsey      | 296/1 S X |
| 3,411,600 | 11/1968 | Loving et al.| 180/14    |

OTHER PUBLICATIONS

Wind Tunnel Tests in "Commercial Car Journal", April, 1955, page 80.

Primary Examiner—Benjamin Hersh
Assistant Examiner—Leslie J. Paperner
Attorney—Watts, Hoffmann, Fisher & Heinke

[57] ABSTRACT

A tractor-trailer combination is streamlined by a tunnel-like air shield between the tractor cab and trailer to effect a smooth continuous body configuration. The air shield is a telescoping self-supporting structure, the length of which can be easily adjusted for the various spacings of different trailers from the tractor. The portion of the shield engaging the forward end of the trailer is flexible to permit normal articulation between the tractor and trailer. The air shield may be temporarily retracted manually or by drive-controlled power means to prevent distortion of the shield during negotiation of abnormally sharp turns.

24 Claims, 8 Drawing Figures

PATENTED JAN 16 1973

INVENTORS
GEORGE C. MADZSAR
OTTO KOZMA
BY
*Watts, Hoffmann, Fisher & Heinke*
ATTORNEYS

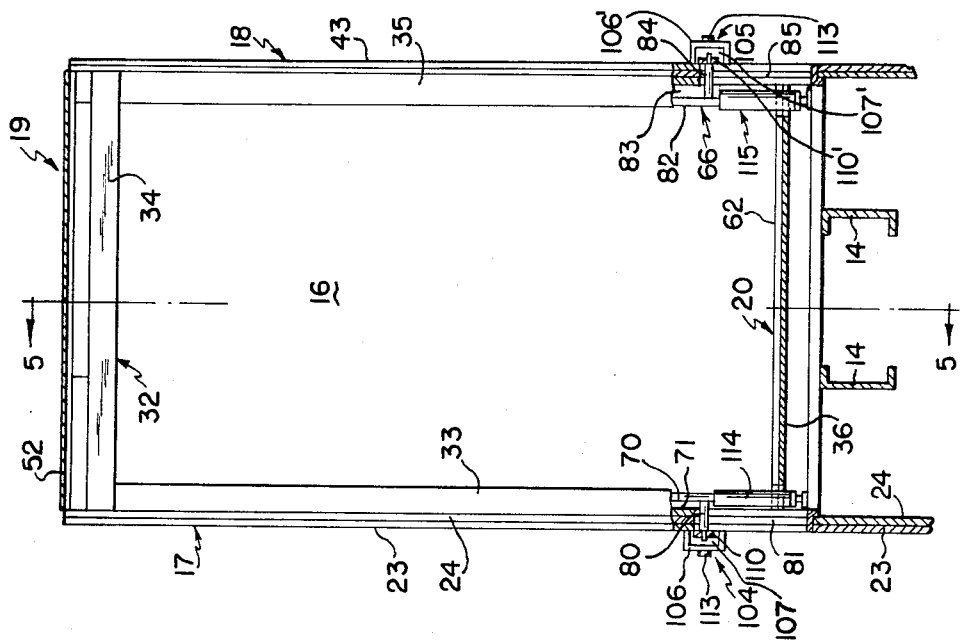
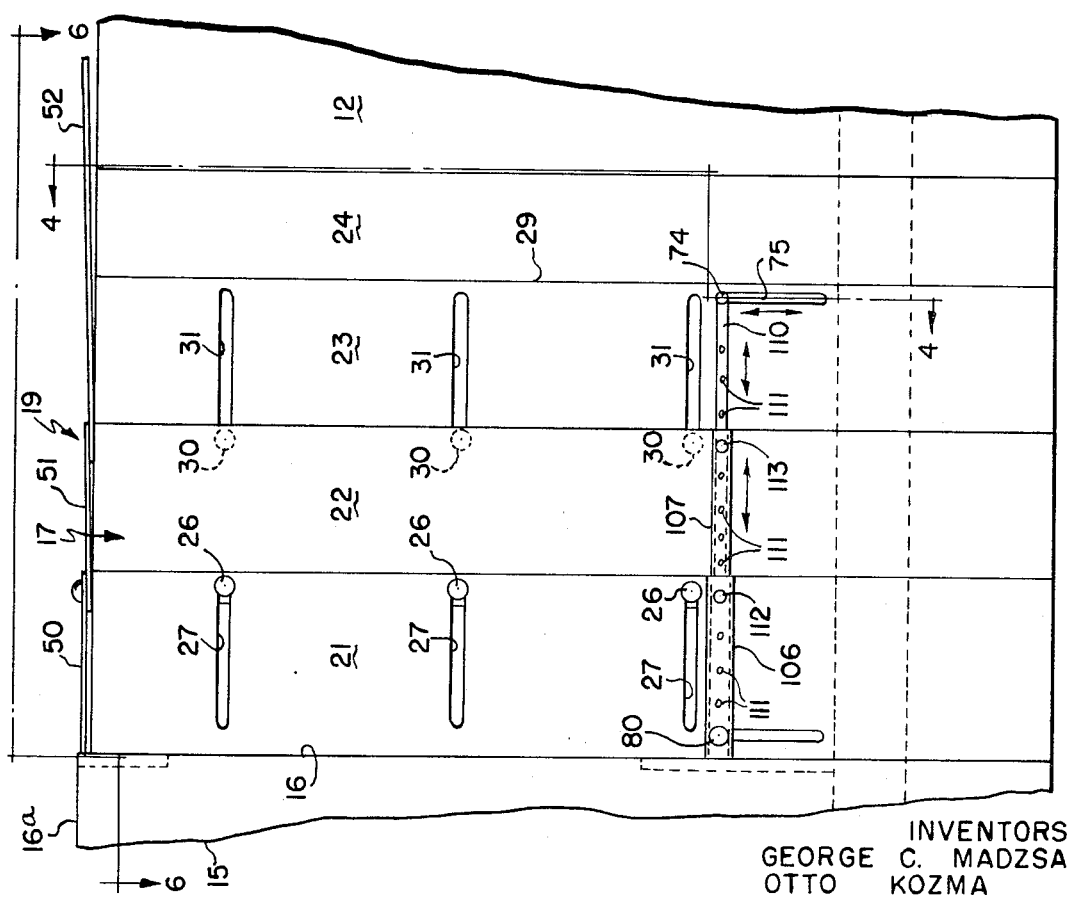

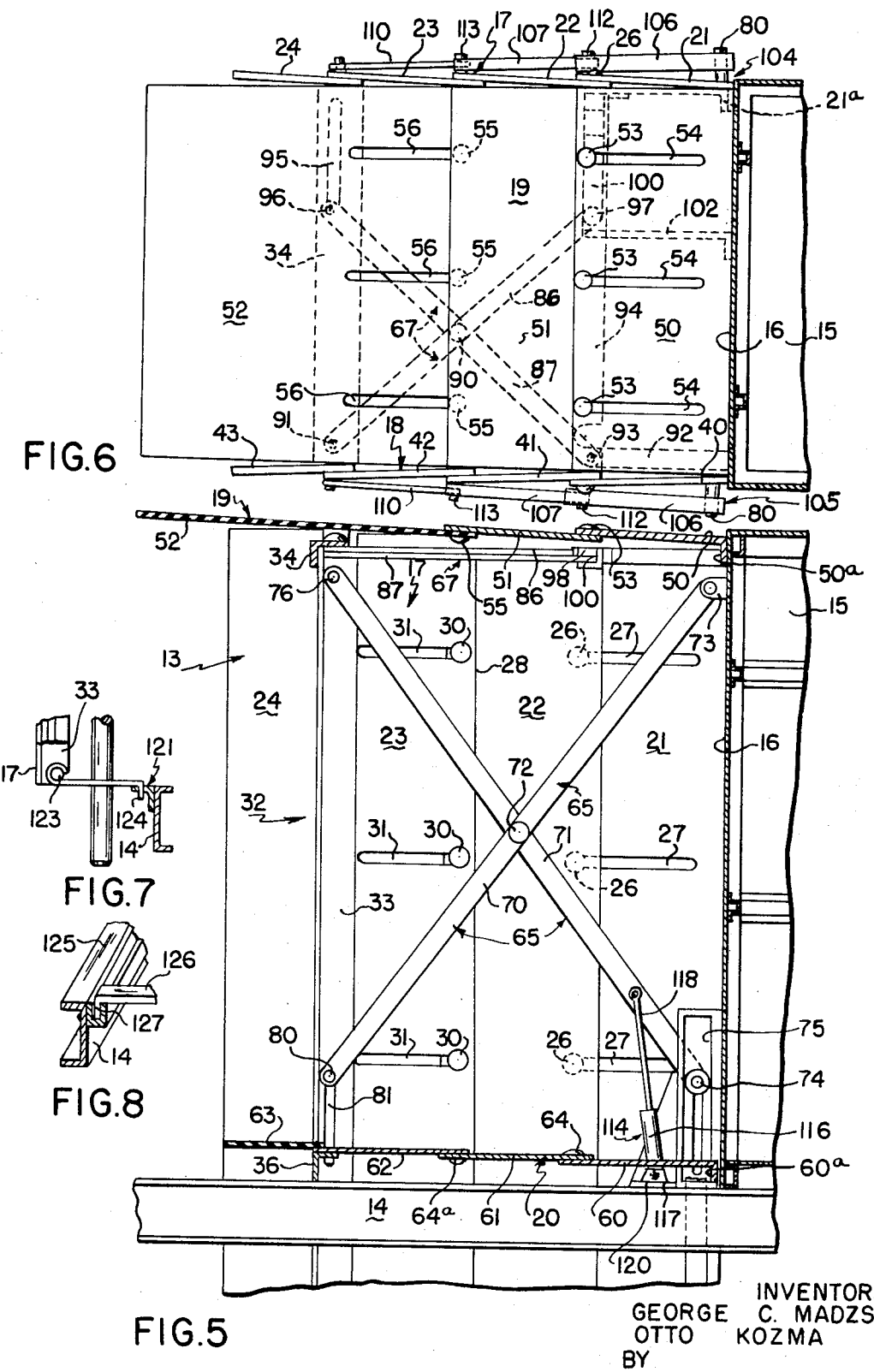

STREAMLINED VEHICLE CONFIGURATION

CROSS REFERENCE TO RELATED APPLICATION

Application Ser. No. 842,145 filed July 16, 1969 by Ernest R. Sternberg, entitled "Over-the-Highway Truck Cab," now U.S. Pat. No. 3,612,599.

BACKGROUND OF THE INVENTION

The present invention relates to over-the-highway cargo hauling tractor-trailer combinations. Tractor-trailer combinations commonly in use consist of a tractor having a so-called fifth wheel by which a semi-trailer may be attached to the tractor by an articulated connection for transportation of the semi-trailer. A combination of this type has several major advantages over a unitary truck including: (1) the tractor can be used to transport many different semi-trailers and need not be idle during loading or unloading of the trailers; (2) the articulated connection between the tractor and semi-trailer provides maneuverability of the combination not possible with a unitary truck of like capacity; and, (3) the position of the fifth wheel can be adjusted longitudinally to adjust load distribution and overall length of the assembly.

One disadvantage of tractor-trailers is that adequate clearance for articulation to about 90° in either direction is provided which results in a space or gap between the rear wall of the tractor cab and the forward wall of the semi-trailer. The differences in tractor-trailer heights coupled with this space between them results in considerable air turbulence and uneven air pressures in the space and adjoining places such as along the sides and roof of the trailer.

The air turbulence generated between the cab and the trailer is objectionable principally because of the resultant excessive vehicle "drag". To obtain maximum economical utilization of tractor-trailer combinations, relatively high roadway speeds must be maintained. At normal highway speeds now prevailing in the industry, the drag on the tractor due to air resistance is overcome only by needlessly large horsepower outputs to cancel the effect of large air resistance, which is due to the poor streamlining. This is a considerable factor in operational costs.

Another objection to the gap between the tractor and trailer is that the air turbulence and uneven air pressures occurring along the sides of the trailer are particularly aggravated by crosswinds. This turbulence accentuates the tendency for the trailer to yaw and adds to the difficulty of steering and handling the combination on the highways. Driving under the conditions described is fatiguing because it requires the constant and close attention of the driver. Furthermore, wind-tunnel tests show air from a crosswind passing through the space between the tractor and trailer can produce a blast effect on passing vehicles.

PRIOR ART

It has been proposed heretofore to reduce air turbulence and drag between tractors and trailers by providing air deflectors on tractors which were intended to cause air to flow smoothly over and around a tractor and trailer. These attempts have not proven to be fully satisfactory. One disadvantage of the air deflectors is that they are more or less ineffective to prevent crosswinds from passing through the space between the tractor and trailer. Another disadvantage is they are not as effective as the structure of this invention in minimizing turbulence.

There have been other proposals for various attachments or integrally constructed wind deflectors on trailers. Those proposals were intended to cut down the turbulence around the trailer and the like. These, too, have not dealt with the problems of crosswinds, nor have they been as effective as the structure of this invention in reducing turbulence to a minimum.

SUMMARY OF THE INVENTION

It has been discovered that the objectionable air turbulence between tractors and trailers can be substantially eliminated by enclosing the gap between the rear wall of the cab and the front of the trailer with a tunnel-like air shield structure. The walls of the air shield provide continuous sides and roof surfaces from the cab to the trailer and thereby provide a streamlined configuration to the combination. The air shield structure is self-supported so as to be conveniently extended and retracted from the rear of the tractor cab to provide proper wall alignment for trailers variously spaced from the cab. The air shield walls are generally rigid, except adjacent the trailer where the walls are somewhat flexible. This flexibility and the fact that the length of the shield structure can be readily adjusted permits the usual articulation between the tractor and trailer. The provision of the air shield results in smooth air flow patterns about the tractor-trailer and the air resistance drag is thereby materially reduced. Calculations indicate a tractor-trailer with 110 square feet full scale area of conventional construction requires 141 horsepower to overcome air resistance at a speed of 60 miles per hour. This air resistance horsepower requirement is basically halved, to 74 horsepower, if the same truck is equipped with the structure of this invention. Wind-tunnel tests suggest these calculations are reasonably accurate.

With this invention, a tunnel-like air shield structure is provided. The structure has walls which are formed by plates supported generally side by side and arranged to slide along adjacent plates to provide telescoping of the air shield. The structure is preferably attached to the rear of the tractor cab. When the air shield is in its retracted or shortened position, it projects from the rear wall of the tractor cab a distance to permit access to the fifth wheel mechanism to effect connection or disconnection of trailers to the tractor. The tunnel structure may then be extended to whatever length is required to slightly overlap the forward ends of the top and sides of the trailer.

Preferably, the tunnel-like shield structure of this invention is used in combination with a tractor of taller-than-conventional height such as that taught in the referenced Sternberg application, with a sleeping bunk above the driver's cab. Ideally, the height of the tractor is the same as the height of the trailer so that smooth, uniform, upper and side surfaces are provided.

When the invention is constructed in the form of an accessory for a conventional vehicle, a roof section is provided which is secured to the roof of the conventional tractor extending upwardly to provide a smooth surface extending upwardly from the tractor roof to the level of the top of the shield and the trailer.

The invention produces a series of outstanding advantages. As indicated above, horsepower requirements are substantially reduced. This results in economies both through reduced fuel consumption and better vehicle utilization. There is better vehicle utilization because: (1) reduced strain on the engine results in longer engine life and reduced down time for maintenance; and (2) reduced horsepower requirements permit a vehicle to more quickly and more easily maintain the maximum legal speed, thus increasing the overall average speed.

As indicated, the reduced turbulence makes the vehicle easier to operate and results in reduced drive fatigue. In addition, noise levels are decreased and the more quite conditions also contribute to the reduction in driver fatigue.

Accordingly, the object of the invention is to provide a novel and improved tractor-trailer combination with a tunnellike shield structure between tractor and trailer to reduce the drag by the substantial elimination of turbulence in the space between the tractor and trailer.

Other objects and advantages of the present invention will become apparent from the following detailed description thereof made with reference to the accompanying drawings which form a part of the specification.

DESCRIPTION OF THE DRAWINGS

FIG. 3 is a fragmentary side elevational view similar to FIG. 2, showing the tractor, air shield, structure and trailer on an enlarged scale with respect to FIGS. 1 and 2;

FIG. 4 is a sectional view as seen from the plane indicated by the line 4—4 of FIG. 3;

FIG. 5 is a sectional view indicated by the line 5—5 of FIG. 4;

FIG. 6 is a view partially in plane and partially in section of the structure shown in FIG. 5 as seen from the planes indicated by the lines 6—6 of FIG. 3;

FIG. 7 is an enlarged fragmentary sectional view of a latch mechanism for preventing lateral sway of a manually-operated version of the shield of this invention; and, FIG. 8 is a fragmentary perspective view of guide tracks for preventing lateral sway of the shield of this invention in an automatic operated version.

Figure 1:
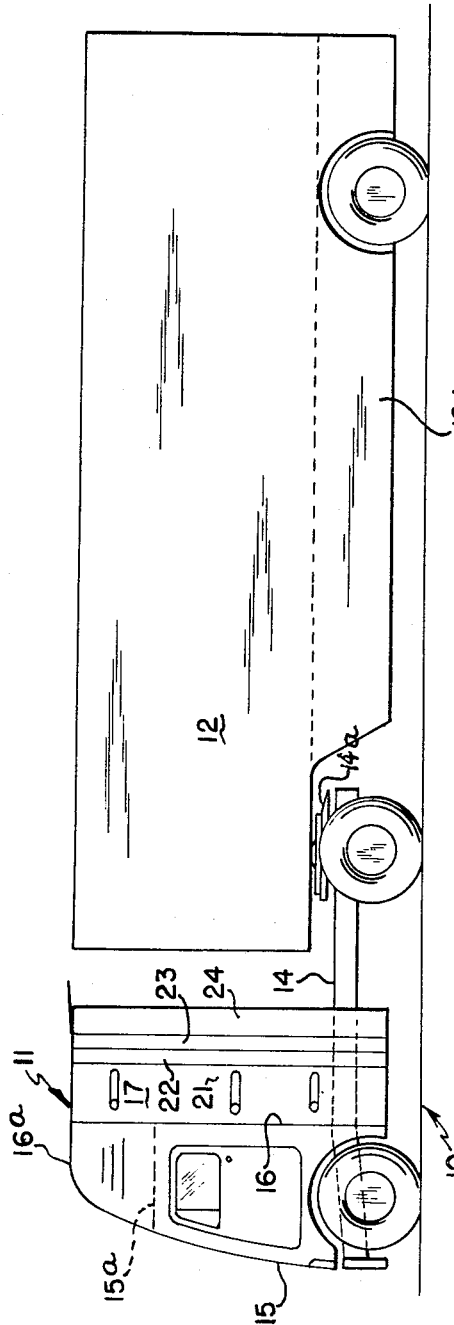
FIG. 1 is an elevational side view of a tractor-trailer combination embodying the invention and showing an air shield structure in its retracted position.
Figure 2:
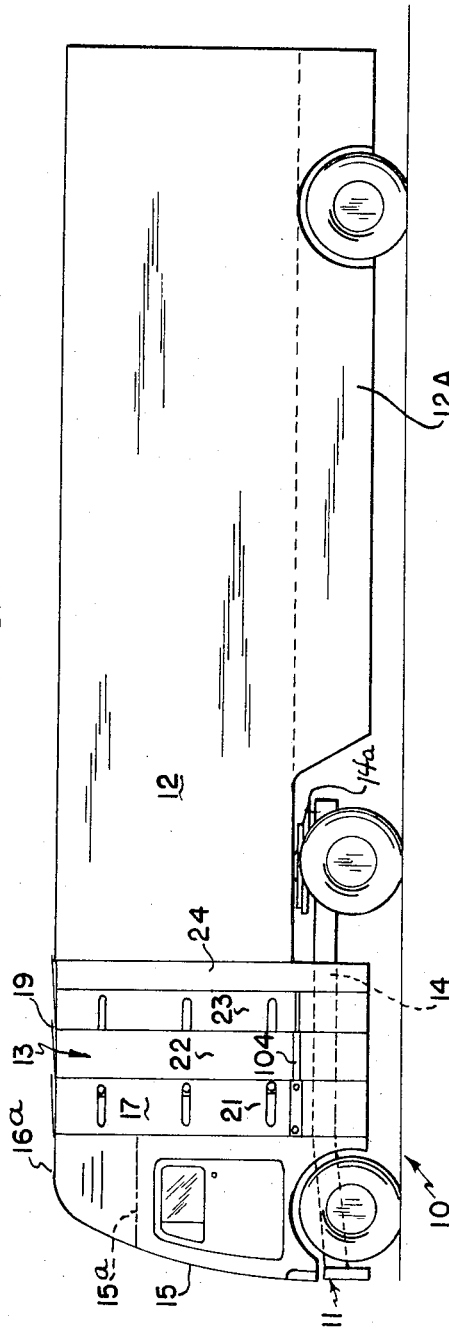
FIG. 2 is a view similar to FIG. 1 showing the air shield structure extended to close the gap between the tractor and trailer.

Referring to the drawings and particularly to FIGS. 1 and 2, a tractor-trailer combination embodying the invention is shown at 10. The combination includes a tractor 11, a semi-trailer 12 and an extendible and retractable air shield structure 13 between the rear of the cab and the front of the trailer. The air shield 13 effects a streamline configuration for the tractor-trailer combination and eliminates objectionable air turbulence which would otherwise occur by reason of the gap between the tractor and semi-trailer.

The tractor 11 is preferably of the type disclosed in the referenced Sternberg application. The tractor is a cab-over-engine type, including a frame 14 and a cab 15 supported on the frame. In the form of the invention shown, rear wall 16 of the cab extends to a cab roof 16a at a height approximating that of the trailer 12. Where the tractor cab 15 is of a more conventional construction, having a roof at the location indicated by the dashed lines 15a, a hood element is provided. The hood element corresponds in shape to that portion of the cab 15 above the dashed lines 15a and is secured in place to provide the desired overall smooth configuration.

The trailer 12 may be a conventional semi-trailer. In the embodiment shown a depending skirt 12a is shown for further turbulence reduction. The trailer 12 is attached to the tractor by a well-known fifth wheel mechanism 14a supported on the frame members 14 of the tractor.

The air shield structure 13 is attached to the tractor cab 15 to extend rearwardly from the cab rear wall 16. The air shield provides relatively smooth opposite side walls 17, 18 and a top wall 19. The side walls 17, 18 and top wall 19 lie substantially in the same planes as the sides and top walls of the tractor and trailer. Preferably, the shield structure has a bottom wall 20, FIG. 5, to prevent air currents entering the shield from underneath and creating turbulence.

The side walls 17, 18 extend downwardly to the plane of the bottom of the skirt 12a. With a skirtless trailer the side walls 17, 18 are preferably shorter, terminating substantially in the plane of the trailer bottom.

The walls of the shield structure are formed of plates or panels arranged side by side and supported so that adjacent plates slide along the surfaces thereof. This permits the shield to be extended and retracted in length by a telescoping action. With the shield structure in its operative position, as seen in FIGS. 2 and 3, the air flow patterns along the sides and tops of the tractor-trailer combination are smooth and uninterrupted.

The side wall 17 of the air shield structure 13 is formed by four elongated metal plates or panels 21, 22, 23 and 24 arranged upright and generally side by side. The plates extend from the plane of the lower edges of the cab upwardly to approximately the plane of the cab roof 16a. The plate 21 has a flange portion 21a, FIG. 6. The flange portion 21a is attached at the rear wall 16 of the cab so that the outer face of the plate 21 is flush with one side wall of the cab 15 and, in effect, forms a rearward extension of the side wall. The rearward edge of the plate 21 overlaps the plate 22 and the latter plate is supported by the plate 21. For this purpose, the overlapped portion of the plate 22 has three vertically spaced, headed pins 26 projecting therefrom, each of which extends through one of three horizontal spaced slots 27 formed in the plate 21. The slots 27 are narrower than the pin heads and the heads engage the outside edges of the slots and prevent lateral separation of the plates 21, 22. The pins 26 engage the edges of the slots 27 and serve to guide the plate 22 for movement along the inner surface of the plate 21 and support the plate 22 vertically.

A forward, vertical edge 28 of the plate 23, FIG. 5, is overlapped by the plate 22. The plate 23 is supported by three headed pins 30 projecting inwardly from the plate 22. Each pin 30 extends through an associated one of three horizontal spaced slots 31 formed in the plate 23. The heads of the pins 30 engage the edge portions of the slots and prevent lateral separation of the plates. The pins 30 cooperate with the sides of the slots 31 to guide the plate 23 for movement along the inner surface of the plate 22 and retain the plate 23 upright.

The plate 23 has a rearward vertical side edge 29, FIG. 3. A portion adjacent the rearward edge 29 overlaps the plate 24. The plate 23 is also attached to one side of a rectangular frame 32 formed by four angle irons 33, 34, 35, 36. The frame 32 is supported upright and for movement longitudinally of the tractor by mechanism described more fully hereinafter.

The plate 24 extends rearwardly of the frame 32 and is arranged to overlap the forward end of one side of the trailer 12. Preferably, the plates 21, 22, 23 are formed of a relatively rigid metal and the plate 24 is formed of a relatively flexible material, such as rubber, so that it may flex during normal articulation between the tractor and trailer.

The side 18 of the tunnel structure is the mirror image of the side 17. The side 18 is formed by plates 40, 41, 42, 43, FIG. 6. The plate 40 is similar to plate 21 and is attached to rear wall 16 of the cab in the same manner as is the plate 21. The plate 41 is similar to plate 22 and is supported on the plate 40 by a pin and slot arrangement in the same manner as plate 22 is supported on plate 21 by the pins 26 and slots 27. The plate 42 is similar to plate 23 and supported on plate 41 by a pin and slot arrangement in the same manner as plate 23 is supported on plate 22 by the pins 30 and slots 31. The outer vertical edge of the plate 42 overlaps a portion of the plate 43 and is attached to the angle iron 35 of the frame 32.

The plate 43 is similar to plate 24 and is attached along one side to the plate 42 and the angle iron 35. Like the opposite side plate 24, the plate 43 is formed of rubber and is adapted to overlap the trailer 12.

The top wall 19 of the tunnel structure is formed by plates 50, 51, 52 which extend between the top edges of the sides 17, 18. The plate 50 is a forward downturned flange 50a, FIG. 5, which is attached to the cab rear wall 16. The plate 51 has a side edge portion beneath the outer side edge of the plate 50. The plate 51 is supported and guided for sliding beneath the plate 50 by three headed pins 53 attached to the plate 51. Each pin 53 extends through an associated one of three slots 54 formed in the plate 50. The heads of the pins 53 cannot pass through the slots 54 and the pins cooperate with the slotted portions of the plate 50 to support and guide the plate 51 along the underside of the plate 50.

The plate 52 is slidingly attached to the projecting side edge portion of the plate 51 by three headed pins 55 attached to the plate 51. The pins 55 each project through an associated one of three slots 56, formed in the plate 52. The pins 55 cooperate with the slotted portions of the plate 52 to support and guide the latter plate for sliding movement beneath the plate 51. The plate 52 is also attached to the top angle iron 34 of the frame 32. Preferably, the plate 52 is formed of a relatively stiff, but flexible material, such as a relatively hard rubber, and it projects beyond the plane of the edges of the side plates 24 and 43 to overlie the trailer.

The bottom wall 20 of the air shield structure is formed of four transversely extending panels or plates 60, 61, 62, 63, FIG. 5. The plate 60 has a turned down flange portion 60a which is secured to the cab wall 16. A forward edge portion of the plate 61 overlies a rearward portion of the plate 60 and is supported and guided for lateral sliding movement over the plate 60 by tree headed pins 64 attached to the plate 60 and extending through slots in the plate 61. Only one pin 64 appears in the drawing, and to avoid needless repetition, the pins and slots are not shown in detail as they are like those described with reference to the plates 50, 51.

The forward portion plate 62 overlies the plate 61 and is slidingly supported along a rearward portion thereof by three spaced pins 64a extending from the plate 62 through slots in the plate 61. Again, the pins and slots are like those described with reference to the plates 51, 52 and are not shown in detail. A rearward portion of the plate 62 is attached to the bottom transverse angle iron 36 of the frame 32.

A forward portion of the plate 63 overlaps the side edge portion of the plate 62 and is also suitably attached to the plate 62. The rearward edge of the plate 62 is forward the plane of the rearward edges of the side plates 24, 43 to abut the trailer 12. Preferably, the plate 63 is formed of a resilient and flexible material, such as rubber.

The shield frame 32 is supported for movement longitudinally of the tractor and above the frame 14 by three scissors type parallelogramming mechanisms 65, 66, 67. The two mechanisms 65, 66 are inside the shield structure adjacent the opposite side walls 17, 18, respectively. One end of each mechanism is attached to the cab rear wall 16 and the other end of each is attached to the frame members 33, 35, respectively. The mechanisms 65, 66 are operative to support the shield frame 32 above the frame 14 of the tractor and to maintain the frame members 33, 35 parallel to the cab wall 16.

The mechanism 67 is located at the top of the interior of the shield and is connected to the cab 15 and the top frame member 34. The mechanism 67 maintains the frame member 34 parallel to the plane of the rear wall 16 of the cab during shifting of the frame 32 to and from the tractor cab. The joint action of the parallelogramming mechanisms maintains the plane of the frame 32 parallel to the rear wall 16 of the cab.

Referring to FIG. 5, the parallelogramming mechanism 65 comprises two crossed bars 70, 71 pivotally joined at their centers by a pin 72. The upper end of the bar 70 is pivotally connected to a bracket 73 attached to the cab wall 16 adjacent the side 17 of the air shield. The lower end of the bar 71 is slidingly connected with the cab wall 16. This connection is effected by a roller 74 projecting from the bar 71 and riding in a vertical guide channel member 75. The guide 75 is secured to the cab wall 16 directly beneath the bracket 73. The centerline of the guide formed by the member 75 is spaced from the wall 16 the same distance as the centerline of the pivot for the bar 70 on the bracket 73. By this arrangement the ends of the bars 70, 71 remote from the cab are supported in spaced vertical relationship and as the bars are shifted from and towards the cab wall, these ends of the bars converge and spread but remain parallel to a line through the pivot at bracket 73 and the centerline of the guide 75.

The rearward end of the bar 71 is pivotally connected with the upper portion of the frame member 33 by a pin 76. The rearward end of the bar 70 is slidingly connected with the lower portion of the frame member 33. This connection is effected by a roller 80 projecting from the bar 70 and extending through a guide slot 81 formed through the frame member 33 and the side plates 23, 24. The center of the pin 76 is in line with the centerline of the slot 81.

The parallelogramming mechanism 66 is identical to the mechanism 65 and for sake of brevity, it is not shown in detail. The mechanism 66 is attached to the cab rear wall 16 and to the upright frame member 35 in the same manner as the mechanism 65 is attached to the cab wall and frame member 33.

Referring to FIG. 4, certain portions of the mechanism 66 appear including the lower portions of two crossed bars 82, 83 which correspond to the bars 70, 71. The mechanism 66 is attached to the lower portion of the frame member 35 by a sliding connection. This connection is effected by a roller 84 which is secured to and projects from the bar 82. The roller 84 extends through a vertical guide slot 85 formed through the upright frame member 35 and the side plates 42, 43. The ends of the bars 82, 83 remote from the cab spread and converge as the shield frame 32 is moved towards and from the cab and support the frame member 35 parallel to the cab wall. Thus, the two mechanisms 65, 66 maintain the sides of the frame 32 parallel to the cab wall as the frame is moved along paths paralleling the centerline of the tractor.

Referring to FIGS. 5 and 6 the third parallelogramming mechanism 67 maintains the top frame member 34 of the frame 32 parallel to the cab rear wall 16. This mechanism comprises two crossed bars 86, 87 pivotally connected at their centers by a pin 90. The bars 86, 87 lie substantially in a plane parallel to and immediately beneath the top plates 50, 51, 52.

The end of the bar 86 adjacent the side wall 18 is pivotally attached to the upper transverse frame member 34 by a pin 91. The end of the bar 87 adjacent the side 18 is pivoted to a bracket 92 by a pin 93. The bracket 92 is U-shaped with the ends of the legs thereof secured to the cab wall 16. The bracket 92 includes a yoke 94 which extends transversely of the shield structure and immediately beneath the top wall 19.

The opposite ends of the bars 86, 87 are slidingly connected with yoke 94 of the bracket 93 and the frame member 34, respectively. The slide connection with the frame member 34 is effected by a guide slot 95 in the frame member 34 and a roller 96 on the bar 86 extending into the slot. The bar 87 is similarly connected with the bracket yoke 94 by a roller 97 attached to the bar and projecting into a channel 100 formed by the yoke.

It will be seen that as the frame 32 is shifted longitudinally of the frame of the tractor, the ends of the bars 86, 87 guided by the slot 95 and channel 100 move in a plane parallel to the plane of the pivot pins 91, 93. This action maintains the frame member 34 parallel to the rear wall 16 of the cab during extension and retraction of the shield structure. Thus, the three parallelogramming mechanisms 65, 66, 67 support the frame 32 for movement along and above the tractor frame while maintaining the frame 32 in a plane substantially parallel to the cab wall 16.

The air shield structure may be locked in various extended and retracted positions. This may be accomplished by lock mechanisms 104, 105, FIG. 4, associated with the respective parallelogramming mechanisms 65, 66. Each lock mechanism comprises a link of telescoping members which are selectively interconnectable with the lower ends of the crossed bars of the parallelogramming mechanisms. The telescoping members can be locked in various lengths to prevent scissoring movement of the crossed bars of the mechanisms.

Referring to FIGS. 3 and 4, the lock mechanism 104 comprises a telescoping link formed of a tubular member 106, a tubular member 107 telescoping inside the member 106 and a bar 110 telescoping in the member 107. The member 106 is attached to the lower end of the bar 71 of the mechanism 65. The connection is effected by an extension on the roller 80 on the cross bar 71 projecting into the tubular member 106 near its forward end. The outer end of the bar 110 is attached to the lower end of the bar 70 of the mechanism by the roller 74 extending through a transverse opening in the bar.

The telescoping members 106, 107, 110 can be locked together by lock pins 112, 113. The members 106, 107, 110 have a series of openings 111 formed therethrough and located so that when the shield structure is telescoped at different positions, at least one opening 111 in member 106 will be aligned with an opening in member 107 and an opening in member 110 will be aligned with an opening in member 107. The pins 112, 113 may then be inserted through the two pairs of aligned openings respectively and lock the members together.

The locking device 105 for the parallelogramming mechanism 66 is identical to the locking mechanism 104 and for sake of brevity it is not described in detail. Like parts, however, bear the same reference characters with a prime.

When the air shield structure is to be adjusted in length, the locking pins of both lock devices 104 and 105 are removed from the locking positions. The air shield may then be moved to the length desired, after which the locking pins are inserted in aligned openings in the telescoping parts 106, 107, 110, etc., as described previously.

The air shield structure can be extended and retracted by power means, if desired. In the form shown, the bars 71 and 83 of the mechanisms 65, 66 are swung about their pivots by fluid cylinders 114 and 115. Both cylinders are identical and for sake of brevity only the cylinder 114 is described. As may be seen in FIG. 5, the motor 114 comprises a cylinder housing 116 supported at one end on a bracket attached to the tractor frame 14. A piston, not shown, reciprocates in the cylinder. A piston rod 118 is attached to the piston and is pivotally attached to the cross bar 71. The housing 116 is pivotally attached to crossbar 120 supported by the tractor frame 14. Reciprocation of the piston actuates the parallelogramming mechanism 65 by swinging the bar 71 about the vertically guided pivot roller 74. The parallelogramming mechanism 66 is adapted to be similarly actuated by the cylinder 115.

Both cylinders 114, 115 are conveniently controlled as by valves in a hydraulic system in the tractor 11. When the power means is utilized to extend and retract the air shield structure, the locking devices 104, 105 need not be employed.

It will be apparent that when the shield structure is extended to enclose the gap between the cab and the trailer, the tractor and trailer will have the configuration of a vehicle having continuous sides and tops. This minimizes undesirable wind drag and turbulence and greatly improves the operating characterstics of the combination. Normal turning or articulation between the tractor and trailer may occur by reason of the flexible end plates 24, 43, 52 and 63. Should abnormally sharp turns be required, the air shield structure can be readily retracted so that the rigid plates of the shield do not interfere with the converging of the tractor and trailer.

Where a manual version of the air shield 13 is provided, there is need for provision against lateral sway of the air shield. This is accomplished by pairs of locking mechanisms one of which is shown in FIG. 7. An apertured bracket 121 is fixed to the vehicle frame 14. A hook member 122 is pivotally mounted at 123 on the angle iron 33 of the frame 32. The hook member 122 has a depension 124 which projects through an aperture in the bracket 121. A locking mechanism, not shown, which is the mirror image of the mechanism shown in FIG. 7 is provided on the opposite side of the vehicle to connect the side 18 of the air shield to the frame. These two locking mechanisms together prevent lateral sway of the shield 13.

Where the powered automatic version is provided, the construction shown in FIG. 8 is used in lieu of the latching mechanism of FIG. 7. FIG. 8 is a fragmentary perspective view of a connection of the shield side 18 to the vehicle frame 14. A channel-bearing 125 is provided. The channel bearing 125 is open at the top and secured to the vehicle frame 14. A shield guide and sway preventing bar 126 projects from the shield side 18 inwardly. The sway bar 126 includes a depending end portion 127 which extends into the channel bearing and slides therealong as the shield is moved forwardly and rearwardly.

An articulation sensing mechanism comparable to that disclosed in U.S. Pat. No. 3,181,889 issued May 4, 1965 to B. C. Harris under the title "Trailer Clearance Device" may be employed. That patent teaches an articulation sensing mechanism which causes a servo system to shift a fifth wheel longitudinally on the vehicle frame to provide trailer clearance. The corresponding servo mechanism may be employed here and connected to the fluid cylinders 114, 115 to cause the air shield to be moved forwardly and rearwardly automatically when the vehicle is articulated at rather severe angles.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An extensible streamlining air shield for streamlining an articulated connection between forward and rearward over-the-highway vehicle units coupled together in tandem towing relationship, comprising:

(a) mounting means for mounting the air shield on one of the vehicle units;
    b. a telescopic arrangement of interconnected panel means supported by said mounting means for retraction to a position spaced from the other unit and for extension so as to streamline the space between said units;
    c. power means to extend and retract said panel means; and,
    d. sensor means for sensing vehicle articulation and coupled to said power means so as to effect extension and retraction of said panel means to at least assist in the accommodation of articulation movement between the vehicle units.

2. An extensible streamlining air shield for streamlining an articulated connection between forward and rearward over-the-highway vehicle units coupled together in tandem towing relationship, comprising:

a. an extensible, retractible streamlining air shield structure;
    b. mounting means for mounting the air shield on one of the vehicle units;
    c. power means for extending and retracting the air shield; and,
    d. sensing means for sensing articulation between the units and for actuating the power means so as to extend and retract the air shield to accommodate for vehicle articulation between the units.

3. A tractor for a tractor-trailer combination comprising:

a. a tractor having a cab and means for connecting a trailer to the tractor;
    b. an extensible tunnel-like air shield structure supported on said tractor with a forward end thereof adjacent the rear wall of said cab and a rearward end spaced from the cab;
    c. said air shield structure having two opposite side walls and a top wall adapted to substantially bridge the space between the sides and tops of the tractor and a trailer connected to the tractor;
    d. means for extending and retracting said structure from and towards said rear wall of said cab and generally parallel the centerline of said tractor so as to move the rearward end of said structure to a position adjacent an attached trailer;
    e. said walls each comprising a plurality of relatively rigid plates arranged generally side by side and extending in a generally common plane, and means to support said plates in each wall for sliding movement along a surface of an adjacent plate whereby said air shield structure is extended and retracted by telescoping action of said walls; and,
    f. said walls each including a relatively flexible plate forming the end portion of said air shield structure remote from said cab.

4. A tractor for a tractor-trailer combination comprising:

a. a tractor having a cab and means for connecting a trailer to the tractor;
    b. an extensible tunnel-like air shield structure supported on said tractor with a forward end thereof adjacent the rear wall of said cab and a rearward end spaced from the cab;
    c. said air shield structure having two opposite side walls and a top wall adapted to substantially bridge the space between the sides and tops of the tractor and a trailer connected to the tractor;

d. means for extending and retracting said structure from and towards said rear wall of said cab and generally parallel the centerline of said tractor so as to move the rearward end of said structure to a position adjacent an attached trailer;

e. said walls each comprising a plurality of relatively rigid plates arranged generally side by side and extending in a generally common plane, and means to support said plates in each wall for sliding movement along a surface of an adjacent plate whereby said air shield structure is extended and retracted by telescoping action of said walls; and, f. said power means being adapted for connection to an articulation sensing mechanism.

5. In combination:

a. a trailer assembly b. a tractor assembly having a cab and articulation means for connecting the assemblies together;

c. an extensible tunnel-like air shield structure supported on one of said assemblies with one end thereof adjacent the rear wall of said cab and the other end adjacent the trailer assembly;

d. said air shield structure having two opposite side walls and a top wall adapted to substantially bridge the space between the sides and tops of the assemblies;

e. said walls each comprising a plurality of relatively rigid plates arranged generally side by side and extending in a generally common plane;

f. means to support said plates in each wall for sliding movement along a surface of an adjacent plate whereby said air shield structure is extended and retracted by telescoping action of said walls; and, g. said means to support said plates including a rectangular frame to which the side walls and top wall of said air shield structure are attached, and a parallelo-gramming mechanism attached at one end to said one assembly and attached at the other end to said rectangular frame.

6. In combination:

a. a trailer assembly;

b. a tractor assembly having a cab and articulation means for connecting the assemblies together;

c. an extensible tunnel-like air shield structure supported on one of said assemblies with one end thereof adjacent the rear wall of said cab and the other end adjacent the trailer assembly;

d. said air shield structure having two opposite side walls and a top wall adapted to substantially bridge the space between the sides and tops of the assemblies;

e. said walls each comprising a plurality of relatively rigid plates arranged generally side by side and extending in a generally common plane;

f. means to support said plates in each wall for sliding movement along a surface of an adjacent plate whereby said air shield structure is extended and retracted by telescoping action of said walls; and, g. said walls each including a flexible plate forming the end portion of said air shield structure at said one end of the shield remote from said cab.

7. In an articulated, over-the-highway vehicle, the combination of:

a. first and second wheeled assemblies adapted for over-the-highway travel;

b. articulation means connecting the assemblies together for relative turning movement and to permit one assembly to pull the other;

c. said assemblies having substantially aligned tops and sides when the assemblies are aligned longitudinally for travel along a straight section of highway;

d. an extensible tunnel-like air shield structure supported on said first assembly with one end thereof adjacent the rear wall of said one assembly and the other end adjacent the said other assembly;

e. said air shield structure having two opposite side walls and a top wall adapted to substantially bridge the space between the sides and tops of the assemblies and to be substantially aligned therewith when the assemblies are longitudinally aligned;

f. said walls of said air shield structure each comprising a plurality of relatively rigid plates arranged generally side by side and extending in a generally common plane;

g. means to support said plates in each wall for sliding movement along a surface of an adjacent plate whereby said air shield structure is extended and retracted by telescoping action of said walls; and, h. said means to support said plates including a rectangular frame to which the sides and top of said air shield structure are attached, and a parallelogramming mechanism attached at one end to said one assembly and attached at the other end to said rectangular frame.

8. In an articulated, over-the-highway vehicle, the combination of:

a. first and second wheeled assemblies adapted for over-the-highway travel;

b. articulation means connecting the assemblies together for relative turning movement and to permit one assembly to pull the other;

c. said assemblies having substantially aligned tops and sides when the assemblies are aligned longitudinally for travel along a straight section of highway;

d. an extensible tunnel-like air shield structure supported on said first assembly with one end thereof adjacent the rear wall of said one assembly and the other end adjacent the said other assembly;

e. said air shield structure having two opposite side walls and a top wall adapted to substantially bridge the space between the sides and tops of the assemblies and to be substantially aligned therewith when the assemblies are longitudinally aligned;

f. said walls of said air shield structure each comprising a plurality of relatively rigid plates arranged generally side by side and extending in a generally common plane;

g. means to support said plates in each wall for sliding movement along a surface of an adjacent plate whereby said air shield structure is extended and retracted by telescoping action of said walls; and, h. said walls each including a flexible plate forming the end portion of said air shield structure at said one end of the shield remote from said second assembly.

9. An extensible streamlining air shield for streamlining an articulated connection between first and second over-the-highway vehicle units coupled together in tandem towing relationship, comprising:

a. mounting means for mounting the air shield on said first vehicle unit;

b. a telescopic arrangement of interconnected panel means supported by said mounting means for retraction to a position spaced from the second unit and for extension so as to streamline the space between said units;

c. said panel means including at least one relatively flexible panel structure disposed near one of said units to accommodate normal articulation movement between the units.

10. The air shield of claim 9 wherein said panel means further includes at least one rigid panel structure disposed near said first unit to facilitate the provision of a relatively rigid air shield structure.

11. A tractor for a tractor-trailer combination comprising:

a. a tractor having a cab and means for connecting a trailer to the tractor;

b. an extensible tunnel-like air shield structure supported on said tractor with a forward end thereof adjacent the rear wall of said cab and a rearward end spaced from the cab;

c. said air shield structure having two opposite side walls and a top wall adapted to substantially bridge the space between the sides and tops of the tractor and a trailer connected to the tractor;

d. means for extending and retracting said structure from and towards said rear wall of said cab and generally parallel the centerline of said tractor so as to move the rearward end of said structure to a position adjacent an attached trailer;

e. said walls each comprising a plurality of relatively rigid plates arranged generally side by side and extending in a generally common plane, and means to support said plates in each wall for sliding movement along a surface of an adjacent plate whereby said air shield structure is extended and retracted by telescoping action of said walls; and, f. said means to support said plates including a rectangular frame to which the side walls and top wall of said air shield structure are attached, and a parallelogramming mechanism attached at one end to said tractor and attached at the other end to said rectangular frame.

12. A tractor for a tractor-trailer combination as defined in claim 11 further characterized by said parallelo-gramming mechanism comprising two scissors arranged bars at opposite sides of said air shield structure and a scissors-type bar device at the top of said shield structure.

13. An extensible streamlining air shield for streamlining an articulated connection between forward and rearward over-the-highway vehicle units coupled together in tandem towing relationship, comprising:

a. mounting means for mounting the air shield on the forward vehicle unit;

b. a telescopic arrangement of interconnected plates supported by said mounting means for retraction to a position spaced from the rearward unit and for extension so as to streamline the space between said units;

c. said plates including a combination of rigid and flexible plates, said rigid plates being disposed adjacent said forward unit and said flexible plates being disposed adjacent said rearward unit such that said rigid plates facilitate the provision of a relatively rigid air shield structure while said flexible plates accommodate normal articulation movement between the units.

14. The air shield of claim 13 additionally including frame means interconnecting said plates for sliding movement and linkage means for concurrently extending or contracting said plates in a telescopic fashion.

15. The air shield of claim 14 further including means to lock the air shield structure in a plurality of extended positions.

16. The air shield of claim 14 wherein said plates are arranged so as to form a pair of side walls and a top wall, which walls are interconnected by said frame means so as to move concurrently as a unit during retraction and extension.

17. The air shield of claim 16 wherein said plates are further arranged so as to form a bottom wall.

18. The air shield of claim 16 additionally including power means to extend and retract said air shield structure.

19. An extensible streamlining air shield for streamlining an articulated connection between first and second over-the-highway vehicle units coupled together in tandem towing relationship, comprising:

a. mounting means for mounting the air shield on said first vehicle unit;

b. a telescopic arrangement of interconnected panel means supported by said mounting means for retraction to a position spaced from said second unit and for extension so as to streamline the space between said units;

c. said panel means including a combination of relatively rigid and relatively flexible panel structures, said rigid panel structures being disposed near one of said units and said flexible panel structures being disposed near the other of said units such that said rigid panel structures facilitate the provision of a relatively rigid air shield structure while said flexible panel structures accommodate normal articulation movement between the units.

20. The air shield of claim 19 additionally including frame means interconnecting said panel structures for telescopic movement and linkage means for concurrently extending or contracting said panel structures in a telescopic fashion.

21. The air shield of claim 20 further including means to lock the air shield structure in a plurality of extended positions.

22. The air shield of claim 19 wherein said panel structures are arranged so as to form a pair of side walls and a top wall, which walls are interconnected by said frame means so as to move concurrently as a unit during retraction and extension.

23. The air shield of claim 22 wherein said panel structures are further arranged so as to form a bottom wall.

24. The air shield of claim 22 additionally including power means to extend and retract said air shield structure.

* * * * *